United States Patent Office 3,133,827
Patented May 19, 1964

3,133,827
SURFACE TREATMENT
Eugen Hofmann, Norton-on-Tees, England, assignor to Imperial Chemical Industries Limited, London, England, a corporation of Great Britain
No Drawing. Filed Oct. 23, 1961, Ser. No. 147,075
Claims priority, application Great Britain Oct. 26, 1960
7 Claims. (Cl. 117—69)

This invention relates to surface treatments and especially to a method of modifying the condition of solid surfaces.

According to the invention there is provided a method of modifying the condition of a solid surface comprising a metal or one or more ionic compounds thereof which comprises applying to the surface a phosphinoborine compound containing the structural unit

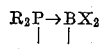

wherein either the groups R are unsubstituted or substituted hydrocarbon or heterocyclic groups or together form a ring structure including the phosphorus atom and the groups X are hydrogen or halogen or unsubstituted or substituted hydrocarbon or heterocyclic groups or together form a ring structure including the boron atom, or else one or more groups R with one or more groups X form a ring structure including a phosphorus and a boron atom, any remaining groups R and X being as already defined.

In a preferred form the invention comprises applying to the surface a cyclic phosphinoborine of general formula

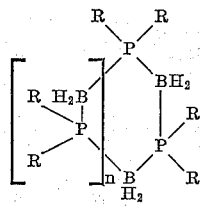

wherein n is a small integer and the groups R are unsubstituted or substituted hydrocarbon or heterocyclic groups or together form a ring structure including the phosphorus atom.

In any phosphinoborine for use in the method according to the invention the groups R are optionally the same or different and so are the groups X.

In the above-mentioned cyclic phosphinoborines it is preferred to have $n=1$ or 2, especially 1. The groups R may be for example aryl groups such as for example phenyl or naphthyl, aralkyl groups such as for example benzyl, alkyl groups such as for example straight or branched alkyl groups containing up to 12 carbon atoms, or cycloalkyl groups. Within the definition of aryl and cycloalkyl groups there are to be included aryl and cycloalkyl groups carrying as substituents other hydrocarbon groups such as for example alkyl groups up to hexyl, for example, methyl. Any of the groups R may if substituted carry as substituents ether groups or difficultly replaceable halogen atoms, for example fluorine or, on aryl radicals, fluorine or chlorine. In order to form a ring structure including the phosphorus atom two groups R may together represent a divalent radical such as for example polymethylene or ortho-xylyl. It is preferred that the groups R be alkyl groups containing from 2 up to about 9 carbon atoms or aryl groups as abovementioned. In particular, good results have been obtained with R=ethyl, n-pentyl, n-octyl or phenyl.

The method of the invention may be employed for treating solid surfaces comprising single metals or alloys or single or mixed ionic compounds of metals. The method is especially effective on surfaces composed at least partly of copper, chromium or titanium or ionic compounds thereof, for example, bronze or brass surfaces, for example aluminium brasses (for example 76% copper, 22% zinc and 2% aluminium), cupronickel, and stainless steels, especially chromium nickel austenitic stainless steels.

By "ionic compounds of metals" is meant compounds in which in the solid state at least one of the metals is present at least partly as ions. Such ionic compounds include in particular corrosion products, for example oxides and basic salts, for example basic sulphates.

The method of the invention is applicable both to smooth surfaces and to rough and highly absorbent surfaces, such as the surfaces of particulate solids.

The modified surface condition resulting from using the method of the invention is often highly stable over long periods of time to the effects of such agencies for example as water, steam and other liquids and vapours at high temperatures. In particular a surface whose condition has been modified in this way resists wetting by water.

In an important aspect the invention provides a method of promoting dropwise condensation of steam on solid surfaces comprising a metal or one or more ionic compounds thereof which comprises applying to the surface a phosphinoborine compound as hereinbefore defined. The liquid produced on surfaces so treated is found rapidly to form drops which run off and leave a film-free surface on which further condensation readily takes place. This property of promoting dropwise condensation is highly valuable in increasing the efficiency of condensers. The modified surface condition is especially long-lasting when the material of the surface is composed at least partly of copper, chromium or titanium or one or more ionic compounds thereof, as already mentioned. The method of the invention effectively promotes dropwise condensation on fouled condensing surfaces, especially when the fouling contains compounds of copper for example a basic copper sulphate.

In a further important aspect, the invention provides a method for inhibiting the corrosion of a metal article which comprises applying to the surface of the article a phosphinoborine compound as hereinbefore defined. The method according to this aspect of the invention is especially valuable for inhibiting corrosion of metal articles under stress, and particularly for inhibiting the corrosion of articles made of stainless steels, especially chromium nickel austenitic stainless steels.

The phosphinoborine compound may be applied to the surface to be treated by any suitable means. Conveniently it is applied in solution in a suitable liquid solvent by spraying, brushing or dipping. Phosphinoborine compounds which are sufficiently volatile may be applied from the vapour phase: thus for example a condenser may be conveniently treated by injecting a solution of trimerised di-n-pentyl phosphinoborine into the vapour entering the condenser; and as a further example sufficiently volatile phosphinoborines may be applied to an absorbent element, such as for example a packaging material, which is thereafter held in juxtaposition to the article whose surface condition is to be modified. It appears that the phosphinoborine compound spreads on the surface to which it is applied more rapidly the lower its melting-point or the higher its volatility or both.

When the phosphinoborine is to be used to prevent the corrosion of a metal article under stress, it is preferably applied while the metal article is in a condition of stress similar to that which it is to be subjected to in use.

The quantity of phosphinoborine compound required is usually very small: it is believed that a unimolecular layer is often sufficient. Thus a suitable quantity of a cyclic phosphinoborine is of the order 10 to 100 milligrams per square metre of surface to be treated.

The invention is illustrated by the following examples.

EXAMPLE 1

*Use In Treating a Condenser To Promote Dropwise Condensation of Steam*

An experimental unit was set up, consisting of a flash boiler and a straight tube horizontal condenser. The boiler was continuously fed with distilled water. The condenser was made up of a ¾ inch diameter straight brass tube (containing 2% of aluminium) placed centrally in an externally insulated glass jacket of 3 inches diameter, exposing a length of 13 inches to the steam. Cooling water was passed through the bore of this tube. The steam inlet was positioned radially in the glass jacket at one end of the condenser. Opposite the steam inlet was positioned a spray nozzle through which liquids could be injected into the condenser. The condenser was operated at near atmospheric pressure and was kept closed to the atmosphere by a condensate water trap.

(a) *Surface treated before setting up the condenser.*—The brass tube was cleaned externally with abrasive paper and then wetted with a 2% solution of trimerised diphenylphosphinoborine (M.P. 179° C.) in benzene, applying the solution with a pad of cotton wool. After evaporation of the solvent a white dusty film appeared on the tube but was wiped off with dry cotton wool. When the condenser was operated it showed 100% dropwise condensation at a steam load of 5 kg./hr./sq. ft. for 300 hours at a steam temperature of 102° C. and for 12 hours at a steam temperature of 150° C. to 200° C. The duration of these tests was dictated by experimental convenience: by the end of the quoted times no tendency towards filmwise condensation was observed.

(b) *Treatment of the condenser surface during operation.*—The brass tube was externally cleaned with abrasive paper. The condenser was set up and the steam turned on, again at 5 kg./hr./sq. ft. and 102° C. A few mls. of dilute hydrochloric acid were then injected into the condenser. After 15 minutes the condensation was substantially 100% filmwise. Then 5 mls. of a 1% solution in acetone of the normally liquid trimerised di-n-pentyl phosphinoborine were injected into the condenser. There was an immediate change to partial dropwise condensation which became 100% dropwise by the end of one to four hours. The time taken for the establishment of substantially 100% dropwise condensation was observed to depend on the cooling water temperature, being shorter the higher the cooling water temperature.

A similar treatment of the condenser was carried out using trimerised diphenylphosphinoborine in solution in acetone. The eventual result was the same but the time taken to establish substantially 100% dropwise condensation was noticeably longer than when the trimerised di-n-pentylphosphinoborine was used.

EXAMPLE 2

The procedure of Example 1(a) was followed using a cupronickel (70% copper, 30% nickel) condenser tube in place of the brass tube. In this test the cupronickel tube was treated with the solution of trimerised di-n-pentylphosphinoborine in benzene before setting up the condenser. With a steam load of 5 kg./hr./sq. ft. at 102° C., it was observed that 100% dropwise condensation was maintained for 3½ months.

EXAMPLE 3

The procedure of Example 1(a) was followed using a copper condenser tube in place of the brass tube. Three trimerised dialkyl phosphinoborines, namely the diethyl, di-n-pentyl and di-n-octyl, were used in successive experiments. Each gave rise to a water-repellant film of great stability against the condensation of steam at 102° C.

EXAMPLE 4

A condenser tube which had been removed from a condenser in regular use with a steam turbine and whose surface was fouled by deposits formed on it during use was treated with a solution of trimerised di-n-pentyl phosphinoborine in benzene and tested with steam at 102° C. as described in Example 1. It was observed that dropwise condensation of steam took place and was unimpaired after 3½ weeks' operation.

By chemical analysis the fouling of the condenser tube was shown to be mainly a mixture of alpha-ferric oxide and the basic copper sulphate, $3CuO.SO_3.2H_2O$.

EXAMPLE 5

An experimental unit was set up in which a plate of metal was removably clamped using a rubber gasket to the end of a heat-resistant glass tube through which cold water was circulated. A flow of steam at 102° C. was directed at the surface of the cooled metal plate and the manner in which it condensed was observed. Plates of 5 different metals or alloys were coated with trimerised di-n-pentyl phosphinoborine and successively clamped to the end of the heat resistant glass tube. All those tested exhibited dropwise condensation, the duration of the dropwise condensation being as shown in the table.

| Metal: | Duration of dropwise condensation |
|---|---|
| Copper | >24 hours. |
| Chromium | >24 hours. |
| Monel metal | After 12 hours partially filmwise condensation. |
| Inconel | After 12 hours partially filmwise condensation. |
| Titanium | >24 hours. |

EXAMPLE 6

*Use in Inhibiting Stress-Corrosion of Stainless Steel*

Using apparatus similar to that described in the article by Hines and Hoar in the Journal of the Iron and Steel Institute, 1956, volume 182, beginning at page 124, a set of 3 untreated stainless steel rods of 0.16 inch diameter whose surface had been pickled and degreased and then treated by brushing on a 10% solution in acetone of trimerised diphenylphosphinoborine were subjected to a stress of 10.3 tons per square inch, a short length (about 8″) of each rod being surrounded by a hot concentrated aqueous magnesium chloride solution (42% w./w., 152° C. to 154° C.) through which air was slowly bubbled. The stainless steel was an austenitic stainless steel having the composition 19.1% chromium, 10.0% nickel and 0.023% carbon, the remainder being iron. A similar set of rods whose surface had been pickled and degreased but not further treated was tested in the same way as controls. It was found that the average time to fracture of the treated rods (1095 minutes) was almost double that of the untreated rods (580 minutes).

In a second test, in which a further set of 3 rods was first pickled and degreased, then stressed to 10.3 tons per square inch, then painted with the trimerised diphenyl phosphinoborine solution and allowed to dry, and then heated at 152° C. to 154° C. in the aerated 42% w./w. magnesium chloride in comparison with 3 pickled and degreased but otherwise untreated rods, a more marked improvement was observed. The average time to fracture of the treated rods (3723 minutes) was now nearly nine times that of the untreated rods (435 minutes).

In a third test a further set of 3 rods was pickled and degreased, stressed to 10.3 tons per square inch, painted with the trimerised phosphinoborine solution, then allowed to dry and heated at 200° C. for 10 minutes. The so-treated rods were tested in the same way as the previously mentioned rods. The average time to fracture of the treated rods (3890 minutes) was found to be again nearly nine times that of untreated rods (462 minutes), tested in the same way as controls.

I claim:
1. A method of modifying the condition of a solid metal substrate having a surface selected from the class consisting of metals and ionic compounds of metals which comprises applying to the surface a cyclic phosphinoborine of general formula

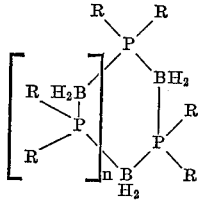

wherein $n$ is a small integer and the groups R are selected from the class consisting of aryl, aralkyl, alkyl containing up to 12 carbon atoms, cycloalkyl, polymethylene, orthoxylyl, and etherified substituents of such groups R, fluorinated substituents of such groups R and chlorinated substituents of such groups R.

2. A method according to claim 1 wherein the phosphinoborine used is one in which $n=1$.

3. A method according to claim 1 wherein the groups R are selected from the class consisting of phenyl groups and alkyl groups containing from 2 to about 9 carbon atoms.

4. A method according to claim 3 wherein the groups R are selected from the class consisting of ethyl, n-pentyl, n-octyl and phenyl groups.

5. A method according to claim 1 wherein the surface is selected from the class of surfaces consisting at least partly of copper, chromium, titanium and ionic compounds thereof.

6. A method for adapting a surface for the dropwise condensation of steam wherein the surface is one selected from the class of surfaces consisting of metals and ionic compounds of metals which comprises applying to the surface a phosphinoborine compound as defined in claim 1.

7. A method for inhibiting the corrosion of a metal article which comprises applying to the surface of the article a phosphinoborine compound as defined in claim 1.

References Cited in the file of this patent

UNITED STATES PATENTS

| | | |
|---|---|---|
| 2,877,272 | Burg et al. | Mar. 10, 1959 |
| 2,920,107 | Burg et al. | Jan. 5, 1960 |
| 2,921,095 | Burg et al. | Jan. 12, 1960 |
| 2,921,096 | Burg et al. | Jan. 12, 1960 |
| 2,925,440 | Burg et al. | Feb. 16, 1960 |
| 2,948,689 | Burg et al. | Aug. 9, 1960 |
| 3,025,326 | Burg et al. | Mar. 13, 1962 |
| 3,065,271 | Burg et al. | Nov. 20, 1962 |